April 26, 1932.     B. F. KELLEY     1,855,801
AUTOMATIC CATHEAD
Filed June 12, 1930
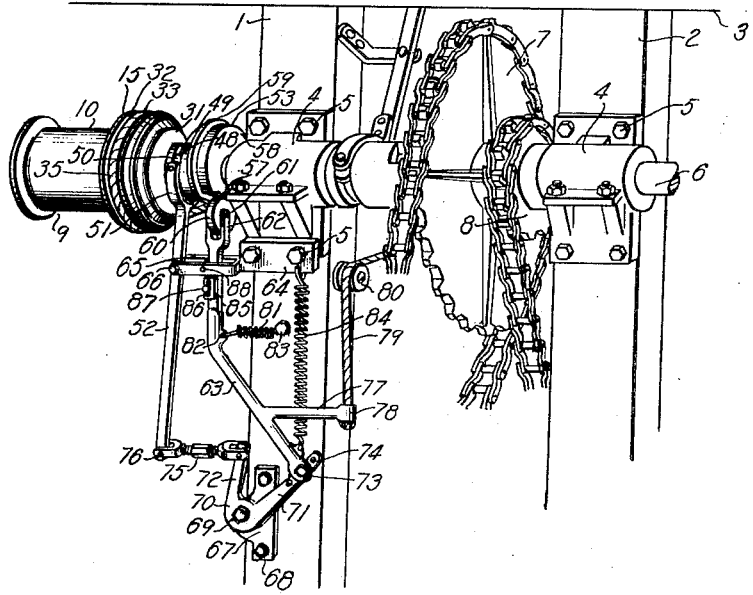
INVENTOR
Benjamin F. Kelley
BY Arthur C. Brown
ATTORNEY Patented Apr. 26, 1932

1,855,801

UNITED STATES PATENT OFFICE

BENJAMIN F. KELLEY, OF TULSA, OKLAHOMA, ASSIGNOR OF ONE-HALF TO ARTHUR O. OLSON, OF TULSA, OKLAHOMA

AUTOMATIC CATHEAD

Application filed June 12, 1930. Serial No. 460,652.

My invention relates to draw works of rotary well drilling equipment and more particularly to cat heads used on equipment of that character for hoisting tools and for operating "jerk lines" used in conjunction with wrenches and tongs for connecting and disconnecting tools and pipe joints.

The principal object of my invention is to embody clutch mechanism in a cat head of this character, and apparatus on the draw works for automatically controlling operation of the "jerk line".

In accomplishing this and other objects of my invention I have provided improved details of structure, the preferred form of which is illustrated in the accompanying drawings, wherein:

Fig. 1 is a perspective view of the cat head and operating mechanism mounted on the draw works.

Fig. 2 is a central longitudinal section of the cat head illustrating the clutch mechanism in disengaged relation.

Fig. 3 is an elevational view of the operating cam mounted on a line shaft.

Referring more in detail to the drawings:

1 and 2 designate the jack posts of an oil well derrick 3, supporting bearings 4 secured to the posts by bolts 5, for journalling a line shaft 6 carrying sprockets such as 7 and 8 for operating well drilling equipment in accordance with common practice.

The ends of the line shaft projecting through the bearings are commonly provided with cat heads for hoisting tools and the like from a well hole, and for operating a "jerk line" attached to wrenches or tongs for threading and unthreading tools and pipe sections.

In order to provide for automatic operation of the wrenches I have devised an improved cat head 9 adapted to replace one or both of the conventional cat heads commonly supplied, and including a spool portion 10 having a concentric opening 11 for mounting the spool on the shaft 6, the cat head being fixed to the shaft by a key 12 secured in a key seat 13 in the spool and slidably engaging a complimentary seat 14 in the shaft.

The inner end of the spool member is provided with a guard flange 15 and with a reduced sleeve extension 16 which constitutes the equivalent of an integral part of the shaft and forms an end face 17 on the spool having an annular groove 18 therein, triangular in cross section and terminating at its inner end in an outwardly directed circumferential oil groove 19 communicating with the outer surface of the spool through ports 20.

Mounted on roller bearings 21, running on a bearing surface 22 of the sleeve 16 adjacent the end face 17, is a pulley 23 having duplicate faces 24 and 25 on its opposite sides, each including an annular flange 26, triangular in cross section complimentary to the groove 18 of the spool member, said flange terminating in a rib 27 extending into the oil groove 19.

Fixed to the outer face 28 of the flange 26 is a band of friction material 29 adapted to engage the corresponding face 30 of the annular groove 18 to effect rotation of the pulley with the spool when urged into frictional contact therewith by sliding movement of a clutch member 31 mounted on the outer end of the sleeve extension 16 and later to be described in detail.

Diverging flanges 32 and 33 on the outer periphery of the pulley form a groove 34 for receiving the end of a wire "jerk line" 35 fixed to the pulley by a staple 36 extended through openings 37 in the flanges 32 and 33 and riveted as indicated at 38.

The clutch member 31, retained in sliding but non-rotatable relation with the shaft 6 by a key 39 fixed in the reduced extension 16 and engaging a seat 40 in the concentric opening 41 of the clutch member, is provided with a face 42 identical in formation to the end face 17 of the spool member for cooperating with the face 25 of the pulley.

Seated in an annular series of sockets 43 and 44 in the pulley and clutch member respectively are springs 45 for urging the heads 46 of plungers 47 against the opposite faces of the pulley to normally maintain the friction bands in disengaged relation with the clutch and pulley members.

Formed in a reduced neck 48 of the clutch member is a circumferential groove 49 for receiving opposite lugs 50 of a clutch yoke 51, terminating in a lever 52 for engaging and disengaging the clutch member with the cat head, in a manner now to be described in detail.

A cam 53 is fixed on the extreme outer end of the reduced portion 16 by a screw 54 threaded into a semi-circular opening 55 and into a corresponding opening 56 in the key 39, the cam including a low lobe 57 extending around approximately one third of its circumference and a remaining high lobe 58; a keeper flange 59 complimentary to the formation of the cam being provided on the outer face thereof for limiting outward movement of a roller 60 rotatably mounted on a pin 61 between the arm 62 of an operating lever 63.

Secured to the jack post 1 by the bolts 5 supporting the lower end of the bearing 4 in a bracket 64, including spaced arms 65 for receiving, therebetween, the lever 63 and for pivotally mounting the clutch lever 52 on a fulcrum pin 66 extended through aligning openings adjacent the outer ends of the arms.

A bearing bracket 67 is fixed to the jack post 1 below the bracket 64 by bolts 68 and provided with a pivoting pin 69 whereon is mounted a bell crank lever 70, having arms 71 and 72 respectively connected to the lower end of the lever 63 by a pin 73 extended through one of a series of apertures 74 in the arm and to an adjustable connecting rod 75 secured to the lower end of the clutch lever by a pin 76.

Extending outwardly from the operating lever 63 in parallel relation with the shaft 6 is an arm 77 provided with a perforated end 78 for receiving an operating cable 79 running over a pulley 80 fixed to the jack post 1, to a convenient point on the derrick floor, for providing means to remotely control engagement of the roller 60 with the cam, the roller being normally retained in disengaged relation with the cam by a spring 81 anchored to the arm 63 and to the jack post 1 as indicated at 82 and 83 respectively.

In order to obviate sufficient upward movement of the roller to prevent its engagement with the cam when urged into contact therewith by a spring 84 anchored to the bracket 64 and to the lower end of the lever 63, a stop block 85 having an elongated slot 86 is secured to said lever by a bolt 87 extending through the slot and into the lever 63 to engage the spaced arms 65 of the bracket upon elevation of the lever, a pin 88 being further provided in the spaced arms to limit outward movement of the operating lever.

Assuming an automatic cat head and operating assembly to be constructed and mounted on a draw works as described for use with a pair of wrenches applied respectively to adjacent upper and lower sections of tubing, operation of the apparatus would be as follows:

The wrench on the upper section is anchored against rotation and the lower wrench is connected to the "jerk line" when connecting adjacent sections of tubing. Operation of the draw works rotates continuously the line shaft 6 and spool member 9, the pulley 23 rotating only when forced into engagement with the spool by the sliding clutch member.

When the operator pulls the cable 79 the roller 60 engages the cam and an intermittent engagement of the pulley with the spool member is effected through the clutch and operating levers thereby moving the lower wrench repeatedly through an arc for threading the tubing sections together, the wrench being returned after each arcuate travel by a spring or similar means anchored to the derrick.

To disconnect adjacent sections of tubing the lower wrench is anchored against rotation and the upper wrench is connected to the "jerk line" to intermittently pull the wrench through an arc of travel in anti-clockwise direction.

It will thus be apparent that a ratcheting effect is obtained in the operation of the wrenches thereby affording a quick and efficient method for joining and disassembling tubing sections and the like.

What I claim and desire to secure by Letters Patent is:

1. In apparatus of the character described, in combination with a support and a shaft rotatably mounted on the support, a pulley rotatable on the shaft, means for limiting longitudinal movement of the pulley on the shaft in one direction, a clutch member on the shaft and adapted for engagement with the pulley to rotate the pulley with the shaft, a lever for actuating said clutch, and means on the support adapted to rock said lever for engaging the clutch with the pulley at regular intervals.

2. In apparatus of the character described, in combination with a support and a shaft rotatably mounted on the support, a pulley rotatable on the shaft, means for limiting longitudinal movement of the pulley on the shaft in one direction, a clutch member on the shaft and adapted for engagement with the pulley to rotate the pulley with the shaft, a lever on said clutch, and means on the support including a lever operably connected with said clutch lever for engaging the clutch with the pulley at equal intervals.

3. In apparatus of the character described, in combination with a support and a shaft rotatably mounted on the support, a pulley rotatable on the shaft, means for limiting longitudinal movement of the pulley on the shaft in one direction, a clutch member on the shaft and adapted for engagement with the pulley to rotate the pulley with the shaft, a cam on the shaft, and a lever on the support operably connected with the clutch and adapted to be actuated by said cam for engaging and disengaging the pulley and clutch member in response to rotational movement of the cam.

4. In apparatus of the character described, in combination with a support and a shaft rotatably mounted on the support, a spool and clutch member on the shaft, a pulley rotatably mounted on the shaft between the clutch member and spool, means in the spool for yieldingly urging the pulley to disengaged relation with the spool, a cam on the shaft, and a lever operably connected with the clutch and adapted to be depressed by said cam for engaging the pulley with the spool in response to rotational movement of the cam.

5. In apparatus of the character described, in combination with a support and a shaft rotatably mounted on the support, a spool and clutch member on the shaft, a pulley rotatably mounted on the shaft between the clutch member and spool, means in the spool and clutch member for normally urging the pulley to disengaged relation with the spool and clutch member, a cam on the shaft, and means reciprocated by said cam in response to rotational movement of the cam for engaging the pulley with the spool and clutch member.

6. In apparatus of the character described, for mounting on a support and a shaft, a spool on the shaft having a groove in one end and a reduced extension on said end, a pulley rotatably mounted on said extension and having an annular flange adapted to engage said groove, a clutch member slidably mounted on said extension, a cam fixed on said extension, and means on the support including pivoted levers connecting the cam and clutch for sliding the clutch member to urge the pulley into engagement with the spool.

7. In apparatus of the character described, for mounting on a support and a shaft, a spool on the shaft having a groove in one end, a pulley rotatably mounted on the shaft and having duplicate opposite faces including an annular flange on each face, a clutch member slidably mounted on the shaft and having an annular groove, a cam on the shaft, a lever pivoted on the support and carrying a roller for engaging the cam, and means operably connecting said lever with the clutch for sliding the clutch member to urge the flanges of the pulley respectively into engagement with the grooves in the spool and clutch member.

8. In apparatus of the character described including a shaft, a spool on the shaft having a groove triangular in cross section in one end and a reduced extension on said end, a pulley rotatably mounted on said extension and having opposite faces including a flange, triangular in cross section, on each face, a clutch member slidably mounted on said extension and having a complementary triangular groove, means for sliding the clutch member to urge the flanges of the pulley respectively into the grooves to engage the spool and clutch member including a cam on said extension, a keeper flange on the cam, means operably connecting said cam with the clutch member including a lever pivoted on the support and carrying a roller engageable with said cam, and means for normally retaining the pulley in disengaged relation with the spool and clutch member.

9. In a cathead of the character described, a shaft, a spool mounted on the shaft having a groove, triangular in cross section, in one end terminating in an outwardly directed oil-collecting groove, a pulley rotatably mounted on the shaft and having opposite faces including a flange, triangular in cross section, on each face and terminating in an outwardly directed rib, a clutch member slidably mounted on the shaft and having an end face complementary to the grooved end face of the spool, said spool and clutch member having discharge ports leading from the collecting grooves, and means for effecting engagement and disengagement of the pulley with the spool and clutch member.

10. An automatic cathead for well drilling equipment including a pulley freely rotatable on a constantly rotating shaft of the equipment, a jerk line on the pulley, a cam in fixed relation with the shaft, and clutch mechanism for engaging the pulley with the shaft including means adapted to be depressed regularly in response to rotation of the cam for intermittently engaging the pulley with the shaft.

11. In apparatus of the character described, in combination with a support and a shaft rotatably mounted on the support, a pulley rotatable on the shaft, means for limiting longitudinal movement of the pulley on the shaft in one direction, a clutch member on the shaft and adapted for engagement with the pulley to rotate the pulley with the shaft, a lever on the clutch, a cam on the shaft, a lever carrying a roller engageable with said cam, and a member pivoted on the support and operably connecting said levers for engaging the clutch with the pulley upon rotation of the cam.

12. An automatic cathead for well drilling equipment including a pulley freely rotatable on a constantly rotating shaft of the equipment, a jerk line on the pulley, a cam in fixed relation with the shaft, clutch mechanism for engaging the pulley with the shaft including means adapted to be depressed in response to rotation of the cam for intermittently engaging the pulley with the shaft, and yielding means in said mechanism for normally disengaging the pulley from the shaft.

13. An automatic cathead for well drilling equipment including a pulley freely rotatable on a constantly rotating shaft of the equipment, a jerk line on the pulley, a cam in fixed relation with the shaft, clutch mechanism for engaging the pulley with the shaft including a member adapted to be regularly depressed in response to rotation of the cam for intermittently engaging the pulley with the shaft, and remote control means for effecting an operable relation between said cam and depressible member.

In testimony whereof I affix my signature.

BENJAMIN F. KELLEY.